(12) United States Patent
Price

(10) Patent No.: US 6,962,361 B1
(45) Date of Patent: Nov. 8, 2005

(54) SECURITY DEVICE FOR GOOSENECK TRAILERS, TRAILER HITCHES, AND SIMILAR ARTICLES

(76) Inventor: Thomas Price, P.O. Box 935, Checotah, OK (US) 74426

( * ) Notice: Subject to any disclaimer, the term of this patent is extended or adjusted under 35 U.S.C. 154(b) by 105 days.

(21) Appl. No.: 10/696,842

(22) Filed: Oct. 30, 2003

(51) Int. Cl.7 .................................................. B60D 1/58
(52) U.S. Cl. ........................................ 280/507; 70/232
(58) Field of Search ..................... 280/417.1, 425.2, 280/432, 441.2, 507; 70/14, 58, 232, 258

(56) References Cited

U.S. PATENT DOCUMENTS

| | | | |
|---|---|---|---|
| 2,544,185 A | 3/1951 | Sargent | 280/33.44 |
| 2,641,124 A * | 6/1953 | Gallagher et al. | 70/232 |
| 3,237,969 A | 3/1966 | Geresy | 280/507 |
| 3,410,580 A | 11/1968 | Longenecker | 280/507 |
| 3,695,631 A | 10/1972 | Schwaiger | 280/507 |
| 3,822,900 A | 7/1974 | Peterson | 280/507 |
| 4,571,964 A | 2/1986 | Bratzler | 70/58 |
| 4,620,718 A * | 11/1986 | Mickelson | 280/432 |
| 4,756,172 A | 7/1988 | Weaver | 70/58 |
| 4,774,823 A * | 10/1988 | Callison | 70/14 |
| 4,841,756 A * | 6/1989 | Curtis | 70/232 |
| 5,063,759 A | 11/1991 | Nee et al. | 70/14 |
| 5,181,405 A | 1/1993 | Wheeler | 70/232 |
| 5,255,545 A | 10/1993 | Wheeler | 70/232 |
| 5,410,893 A | 5/1995 | Easterwood | 70/14 |
| 5,513,871 A | 5/1996 | Johnson | 280/507 |
| 5,520,030 A | 5/1996 | Muldoon | 70/14 |
| 5,987,938 A * | 11/1999 | Frei | 70/14 |
| 6,019,337 A | 2/2000 | Brown | 248/354.5 |
| 6,109,078 A | 8/2000 | Marshall | 70/232 |
| 6,315,315 B1 | 11/2001 | Seale | 280/507 |
| 6,412,313 B1 | 7/2002 | Bernstrom | 70/14 |
| 2003/0057678 A1 * | 3/2003 | Barton | 280/507 |

* cited by examiner

Primary Examiner—Matthew Luby
(74) Attorney, Agent, or Firm—Head, Johnson & Kachigian

(57) ABSTRACT

A security device used with trailers comprising first and second attached security chambers, the first chamber providing a security bolt orifice allowing insertion of a security bolt. A security pin orifice bored through one side of the chamber allows insertion of a security pin. The second chamber provides security bolt orifices to also allow insertion of the security bolt. A lock is inserted into the first chamber, with a lock body portion dimensioned to fit within the proximal interior portion of the first chamber, and a non-linear shackle portion dimensioned to fit within the distal interior portion of the first chamber. A security bar having a security bolt orifice bored therethrough permits traversing of the bar by the security bolt. The security bar is dimensioned to allow its insertion within the second chamber and unimpeded passage of the security bolt through the bar's bolt orifice.

13 Claims, 5 Drawing Sheets

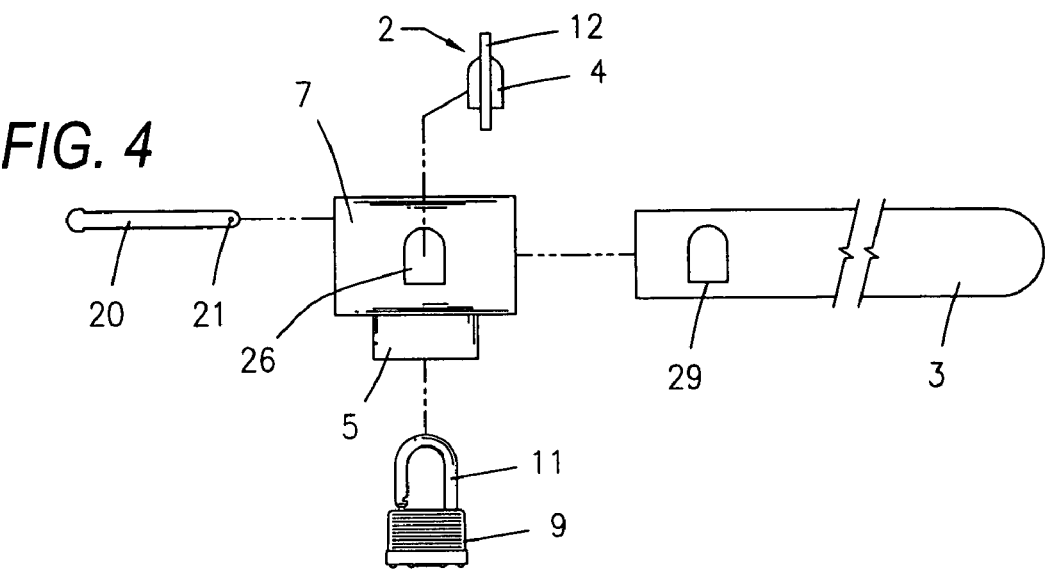
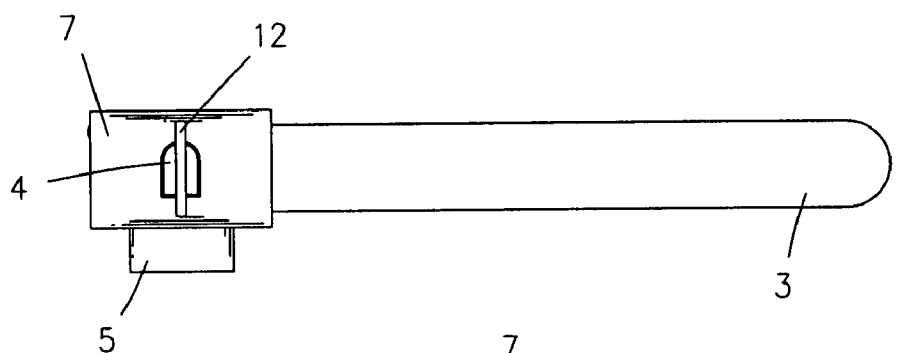
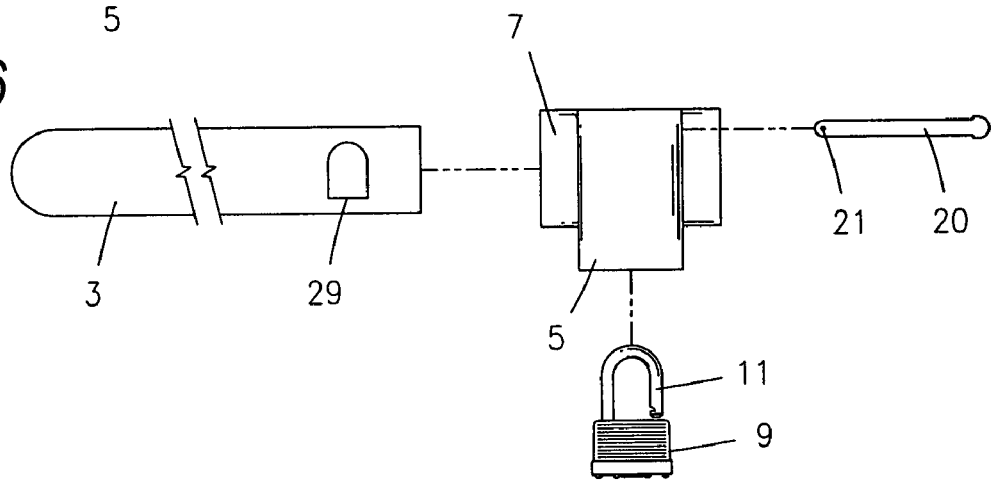
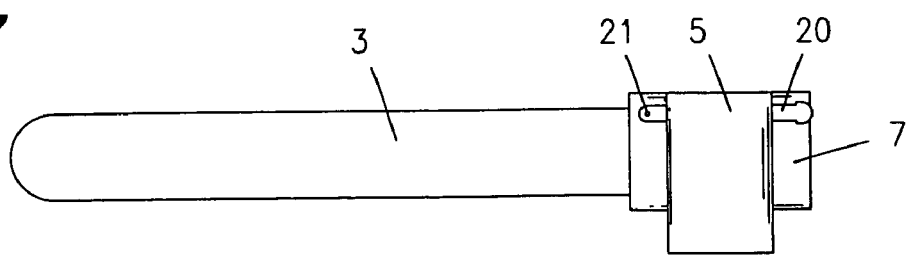

SECURITY DEVICE FOR GOOSENECK TRAILERS, TRAILER HITCHES, AND SIMILAR ARTICLES

TECHNICAL FIELD OF THE INVENTION

The present invention relates generally to a new and novel security device for a trailer hitch, gooseneck trailers or similar articles. More particularly, the present invention relates to a security device which attaches to a gooseneck trailer, trailer hitch or similar article and prevents automobile, truck or other towing vehicle to position itself in a manner to connect to the trailer or trailer hitch and tow the trailer.

BACKGROUND AND SUMMARY OF THE INVENTION

Gooseneck and other types of trailers attached to towing vehicles are commonly used to transport machinery, livestock, and other goods as well as recreational vehicles. When the trailer is separated from the towing vehicle the trailer and its goods are subject to theft by the unauthorized coupling to a towing vehicle. Gooseneck trailer hitches are of a limited variety, frequently being of standard type or shapes. Examples are kingpin hitches which consist of cylindrical posts containing circumferential recesses and fit into matching openings mounted on the towing vehicle; and gooseneck hitches. The typical or standard gooseneck hitch consists of a coupler attached to the lower end of a generally vertical post, the upper end is either attached to the trailer or to a horizontal beam which is attached to the trailer. The trailer hitch coupler at the lower end of the post connects with a protruding device on the towing vehicle. The coupler itself consists of different shapes and configurations but generally has a fixed plate attached to the vertical post and a moveable plate that is offset to reduce the diameter of the opening when closed, to lock around the ball (protruding device) on the towing vehicle. Both the fixed plate and the moveable plate have a 25/16" diameter hole that aligns when the coupler is in the receiving or unlocked position and the ball (protruding device) on the towing vehicle has a maximum 25/16" diameter that fits in the receptacle formed by the coupler. When the coupler is moved to the closed or locked position the diameter of the hole in the coupler is reduced by at least ½" effectively securing or locking the ball (protruding devise) of the towing vehicle with the coupler.

Other trailer hitches are used in conjunction with towing vehicles and are well known to those skilled in the art. Such hitches allow for the coupling of a towing vehicle to a non-gooseneck trailer form which would allow a towing vehicle, such as, but not limited to, a car or truck to associatedly connect to the trailer for towing purposes. Non-limiting examples of "standard" trailer hitches can be found on flatbed trailers, boat trailers, utility trailers and an almost infinite variety of application uses.

There is a need for a durable, inexpensive, simply operated, effective hitch lock for trailers, both in gooseneck and non-gooseneck (standard hitch) applications. Locking devices for king-pin or ball and socket hitches cannot be used on gooseneck couplers, because such locking devices will not fit around or be attachable to the coupler of a gooseneck hitch.

The prior art has been principally directed toward locking devices for gooseneck trailer hitch couplers that surround the coupler, obstruct the insertion of the towing ball, and utilize either a built-in lock or an external padlock; a devise that is inserted into the coupler opening but is secured by an external device that fits over the coupler locking arm and utilizes a padlock; and devices that fill the coupler with a ball that is attached to a telescoping pole that is attached to the forward end of the trailer with a padlock.

U.S. Pat. No. 5,255,545 issued Oct. 26, 1993 to Wheeler for gooseneck trailer hitch locking device, U.S. Pat. No. 5,322,316 issued Jun. 21, 1994 to Wheeler for anti-theft coupler device, and U.S. Pat. No. D402,602 issued Dec. 15, 1998 to Niswanger for universal gooseneck trailer lock are of the type that surround the coupler.

U.S. Pat. No. 5,513,871 issued May 7, 1996 to Johnson for gooseneck trailer hitch locking device is of the type that is inserted into the coupler but locks externally to the coupler locking arm and is secured with a padlock.

All of the above inventions and patents show a vulnerability either with multiple parts that are easily misplaced and difficult to assemble, padlocks and chains which are easily cut with bolt cutters, massive devices that are hard to store when not in use, or failure to obstruct the coupler opening and the coupler movement itself.

Quite distinguishable from the above cited art, the present invention relates generally to a new and novel security device for a gooseneck or non-gooseneck trailer hitch or similar article. More particularly, the present invention relates to a security device which attaches to a coupling for a gooseneck trailer, trailer hitch or similar article, thus precluding unauthorized hitching or movement of the trailer.

The concept of utilizing a security device to preclude access to the coupling opening of a trailer hitch when a trailer is left unattended is well known. U.S. Pat. No. 3,410,580 to Longenecker, U.S. Pat. No. 3,526,110 to Foote, U.S. Pat. No. 3,780,546 to Longenecker, U.S. Pat. No. 3,810,664 to Nunnink, Jr., et al., U.S. Pat. No. 3,977,221 to Foote, U.S. Pat. No. 4,291,557 to Bulle, et al. and U.S. Pat. No. 4,581,908 to Bulle, et al. are directed to security devices for a trailer hitch which utilize a lock integral to the security device. Such integral locking arrangements typically add to the complexity and cost of the security device, and the substitution of alternate locks is not readily accomplished. Also, such integral locking arrangements are often adversely affected by exposure to the environment, and thus can be rendered ineffective by moisture, freezing and thawing temperature cycles and corrosion. Further, some of these devices require an additional separate tool to secure the security device to the trailer hitch.

U.S. Pat. No. 2,571,349 to Eckles, U.S. Pat. No. 3,237,969 to Gersey, U.S. Pat. No. 3,434,741 to Grant, Jr. and U.S. Pat. No. 3,884,055 to Vuillemot are directed to trailer hitch security devices which are retained by a Padlock. Such an arrangement permits the lock to be readily changed, and typically reduces the cost and complexity of the security device. However, in these devices, the shackle of the padlock remains exposed when positioned in the security device. Thus, the padlock shackle is exposed to unauthorized removal by tools such as bolt cutters, hack saws or pry bars. Once the padlock is so removed, these security devices are rendered inoperative.

U.S. Pat. No. 4,141,569 to Dilk and U.S. Pat. No. 4,730,841 to Ponder both disclose trailer hitch security devices which utilize padlocks. Also, these devices include an enclosure for surrounding, and thus protecting the shackle of the padlock. However, in use, these security devices are large, heavy and cumbersome. Further, these devices would be relatively expensive to produce because of the mass of material necessary to fabricate these devices, as well as the relatively large number of parts involved.

Accordingly, an object of the present invention is the provision of a security device for a trailer hitch or similar article which is relatively light in weight given its function and design, and compact in size, but yet provides protection from unauthorized removal.

A further object of the present invention is to provide a security device for a trailer hitch or similar article which does not require a separate tool to engage the security device to the trailer hitch or similar device.

Still another object of the present invention is to provide a security device for a trailer hitch or similar article which utilizes a padlock and includes protection means to deter unauthorized removal of the padlock.

Other objects, advantages and novel features of the present invention will become apparent from the following detailed description of the invention when considered in conjunction with the accompanying drawings.

A security device for use with gooseneck trailers, trailer hitches and similar articles comprising a trailer having a coupler and a security device connecting to the coupler, the security device further comprising (a) a first security chamber attached to said coupler and a second security chamber, said first chamber having a security pin orifice bored through at least one side of the chamber to allow insertion therethrough of a security pin and at least one security bolt orifice to allow insertion therethrough of a security bolt; the said second security chamber having at least two security bolt orifices to allow insertion therethrough of said security bolt; (b) a lock adapted to be inserted into the first security chamber, said lock having both lock and unlocked positions with a lock body portion dimensioned to fit within the proximal interior portion of the first security chamber and a non linear shackle portion removably retained within said lock body and dimensioned to fit within the distal interior portion of the first security chamber; and (c) a security bar having a security bolt orifice bored therethrough to permit the traversing said bar by said security bolt, the security bar dimensioned to allow insertion within said second security chamber and unimpeded passage therethrough of the security bolt via said security bar security bolt orifice.

DESCRIPTION OF THE DRAWINGS

FIGS. 4 and 5 illustrates security device of FIGS. 1 through 3 from a top view perspective with FIG. 4 showing invention elements observable from this perspective in an exploded state and FIG. 5 illustrating the invention of said figures in an assembled state.

FIGS. 6 and 7 illustrates security device of FIGS. 1 through 5 from a bottom view perspective with FIG. 6 showing invention elements observable from this perspective in an exploded state and FIG. 7 illustrating the invention of said figures in an assembled state.

DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

Figure 1:
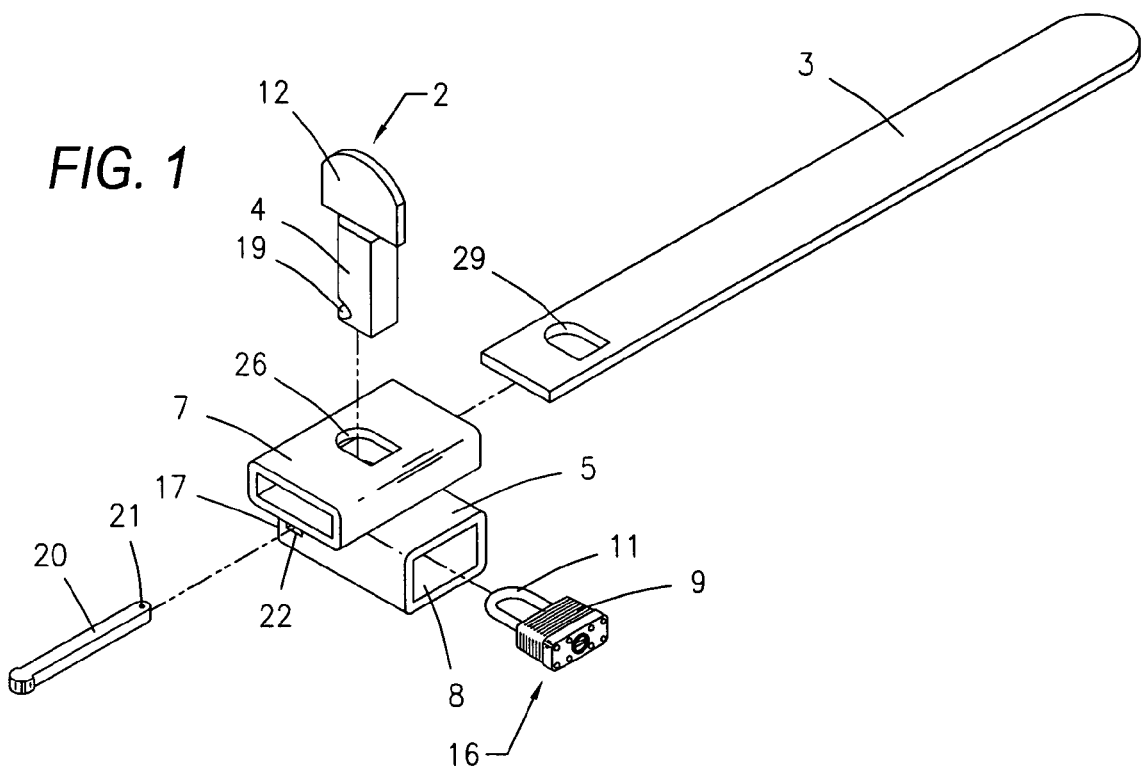
FIG. 1 is an exploded view illustration of one embodiment of the instant invention used in association with gooseneck trailer applications.

FIG. 1 is an exploded view illustration of one embodiment of the instant invention used in association with gooseneck trailer applications. Turning now to FIG. 1.

The instant invention is disclosed in an embodiment readily adaptable to gooseneck trailer applications wherein a first security chamber 5 is attached to a second security chamber 7. The first security chamber 5 has a security pin orifice 22 bored through at least one side of the chamber 5 to allow insertion therethrough of a security pin 20 and further contains at least one security bolt orifice 13 (not shown in FIG. 1 further discussed in association with FIG. 3) to allow insertion therethrough of security bolt shaft 4. Both a shaft grip portion 12 and shaft portion 4 comprise the security bolt 2 of the instant invention. The security bolt shaft 4 further embodies a shaft indentation portion 19 about which a non-linear lock shackle 11 is positioned to secure the security bolt to shaft portion 4 within the first security chamber 5. The second security chamber 7 contains at least two security bolt orifices 26 to allow traversing of the bolt 4 therethrough and further allowing said bolt shaft 4 to enter first security chamber 5 in a position to allow said bolt's envelopment by shackle 11 within first security chamber 5. A lock 16 is dimensioned to be inserted into the first security chamber 5 with said lock having both locked and unlocked positions with a lock body portion 9 dimensioned to fit within the proximal interior portion 8 of the first security chamber 5 and the non-linear shackle portion 11 removably retained within said lock body 9 dimensioned to fit within the distal interior portion 17 of the first security chamber 5. The security device particularly adapted for use in association with common trailer applications as illustrated in FIG. 1 further identifies and discloses a security bar 3 having a security bolt orifice 29 bored therethrough to also permit the traversing of said security bar 3 by bolt portion 4. Security bar 3 is dimensioned to allow its insertion within the second security chamber 7 allowing unimpeded passage therethrough of the security bolt portion 4 via said security bar security bolt orifice 29. A security pin 20 comprising further a security pin bore 21 allows for dimension for insertion through security pin orifice 22 to restrict or otherwise impede an opening movement of the non-linear lock shackle 11 once positioned within the first security chamber 5 about shaft indentation 19. Said pin 20, bolt 2 and lock shackle portion 11 discussed further in detail in association with FIG. 3.

Figure 2:
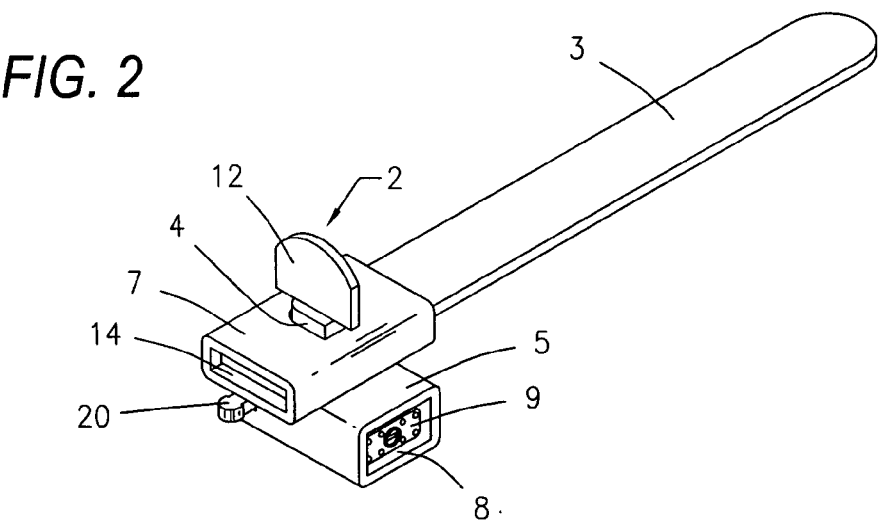
FIG. 2 is an illustration of the security device of FIG. 1 illustrated in a non-exploded assembled state.

FIG. 2 is an illustration of the security device of FIG. 1 illustrated in a non-exploded assembled state. Turning now to FIG. 2.

In FIG. 2, the common trailer application embodiment of the instant invention is shown in an assembled state wherein element 3 again refers to the security bar; 12 relates to the shaft grip portion of security bolt 2 and surrounds shaft indentation 19 to preclude withdrawal of bolt 4 from said first 5 and second 7 security chambers once deployed and positioned therein. FIG. 2 also shows the distal portion 14 of the second security chamber 7 and the lock body portion 9 inserted within the proximal interior portion 8 of first chamber 5. Also shown in FIG. 2 is security pin 20 inserted through orifice 22 (not shown in FIG. 2) of said security chamber 5 to preclude non-linear shackle portion 11 from opening movement once surrounding shaft indentation 19 (see FIG. 1, 3).

Figure 3:
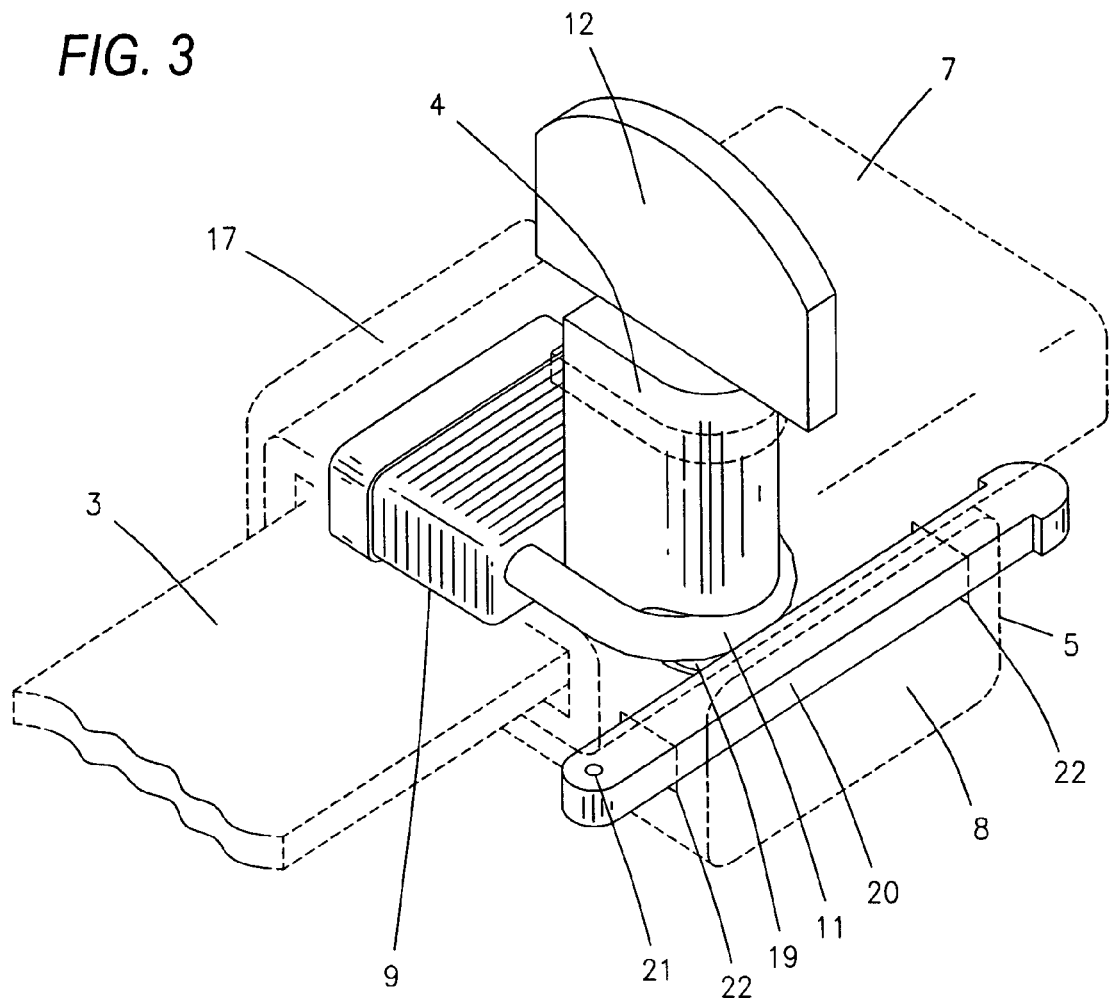
FIG. 3 is a detailed illustration of the locking mechanism structure practiced in association with the security device of FIGS. 1 and 2.

FIG. 3 is a detailed illustration of the locking mechanism structure practiced in association with the security device of FIGS. 1 and 2. Turning now to FIG. 3.

In FIG. 3 a view of the security bolt shaft portion 4 and shaft indentation portion 19 is observed, as can security bolt shaft grip portion 12. In phantom, security bar 3 is shown inserted within second security chamber 7. Security pin 20 is shown inserted through orifices 22 first security chamber 5 with said security pin 20 bore 21 presented to allow connection to additional securing means, such as pin or small lock to preclude security pin 20 inadvertent or deliberate removal from chamber 5 once so inserted. The non-linear lock shackle 11 is shown positioned about shaft indentation 19, and once so positioned in concert with security pin 20 insertion through first security chamber 5, preclude its opening or projecting movement from lock body 9. That is, once secured according to the disclosure provided by FIG. 3 the non-linear shackle portion 11 requires a first removal of pin 20 in advance of any attempt to withdraw shaft 4 from its insertion through first security chamber 5 and second security chamber 7.

FIGS. 4 and 5 illustrates security device of FIGS. 1 through 3 from a top view perspective with FIG. 4 showing invention elements observable from this perspective in an exploded state and FIG. 5 illustrating the invention of said figures in an assembled state. FIGS. 6 and 7 illustrates security device of FIGS. 1 through 5 from a bottom view perspective with FIG. 6 showing invention elements observable from this perspective in an exploded state and FIG. 7 illustrating the invention said figures in an assembled state. Turning now to FIGS. 4 through 7.

In FIGS. 4 through 7 it is disclosed where the security bolt 2 is shown embodying both grip 12 and bolt portions 4. Also shown in FIG. 4 is the second security chamber 7 security bolt orifice 26 which extends through upper and lower surfaces of security chamber 7 and in concert with orifice 29 of security bar 3 allows passage therethrough of security bolt shaft portion 4 when security bar 3 has been inserted with orifices 26 and 29 in alignment. Also shown is the positional representation of first security chamber 5, non-linear lock shackle 11 and lock body 9.

Figure 8:
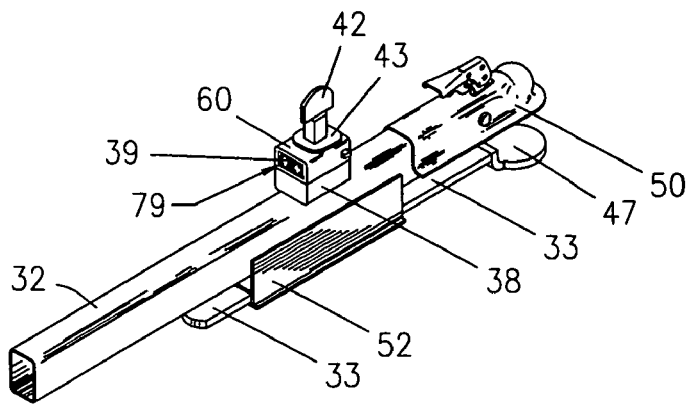
FIG. 8 illustrates an alternative embodiment of the instant invention wherein the security device illustrated is configured for use with commonly encountered, standard, non-gooseneck trailer applications.
Figure 9:
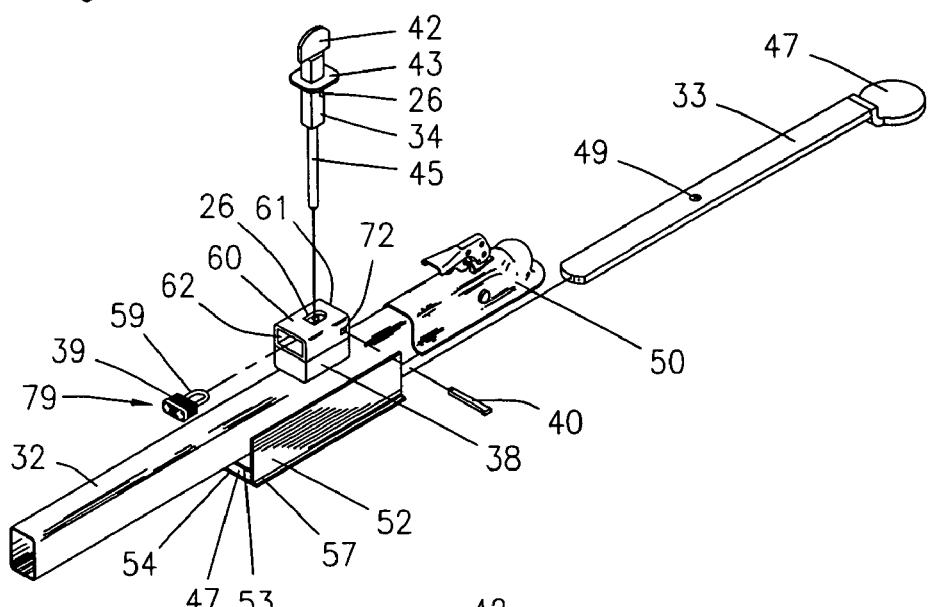
FIG. 9 is an exploded state illustration of the alternative embodiment provided as FIG. 8.

FIG. 8 illustrates an alternative embodiment of the instant invention wherein the security device illustrated is configured for use with commonly encountered, standard, non-gooseneck trailer applications. FIG. 9 is an exploded state illustration of the alternative embodiment provided as FIG. 8. Turning now to FIGS. 8 and 9.

In this embodiment, a standardized trailer hitch 50 well known to those skilled in the art is typically attached to standard trailer hitch connection member 32 with such connection member 32 further integrated or otherwise connected to a non-moving supporting member of a non-gooseneck trailer. A security bar receiving member 52 is attached to the trailer hitch connection member 32 with the security bar receiving member 52 having a top portion 53, a bottom portion 57, two distally and generally opposed side portions 56 (one shown in perspective view of FIG. 9), a bottom portion 54 with said portions 56, 54, 53, 57 forming a security bar receiving member chamber 47. A first security chamber riser 38 is attached to a first security chamber 60 with said first chamber 60 having a security pin orifice 72 bored through the chamber to allow insertion therein of a security pin 21. Said first security chamber 60 is further comprised of at least two security bolt orifices 26 through top and bottom portions of said chamber to allow passage therethrough of a security shaft projection 45 and shaft 34. A lock 79 having locked and unlocked positions and a lock body portion 39 dimensioned to fit within the proximal interior portion 62 of the first security chambers 60 and a non-linear shackle portion 59 removably retained within said lock body and dimensioned to fit within the distal interior portion 61 of the security chamber 60 and about shaft indentation portion 26. A security bar 33 having a security bolt orifice 49 bored therethrough permits the traversing of security bolt shaft projection 45 with the security bar 33 dimensioned to allow its insertion within said second security chamber 47 and unimpeded passage therethrough of the security bolt projection portion 45 via said security bar security bolt orifice 49.

Figure 10:
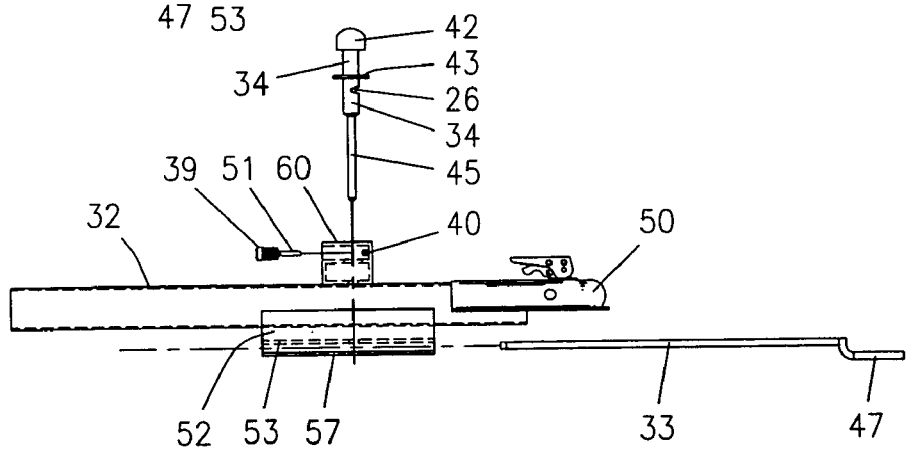
FIG. 10 is a side view exploded illustration of the security device of FIGS. 8 and 9 in an exploded state.
Figure 11:
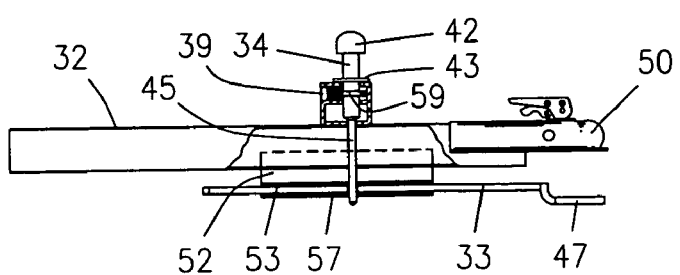
FIG. 11 is a part cross-sectional, assembled view of the exploded state invention provided as FIGS. 8, 9 and 10.

FIG. 10 is a side view exploded illustration of the security device of FIGS. 8 and 9 in an exploded state. FIG. 11 is a part cross-sectional, assembled view of the exploded state invention provided as FIGS. 8, 9 and 10. Turning now to FIGS. 10 and 11.

FIGS. 10 and 11 show the elements of the embodiment of FIG. 9 in conjunction with assembled elevation/part phantom and cross-sectional views respectively illustrated.

In either embodiment of the instant invention, it is clear that either embodiment may be comprised of a hardened metal or hardened metal composition however a distinguishing characteristic of the non-gooseneck embodiment would be an offset flange 47 of the invention illustrated in FIGS. 8 through 11 wherein said offset 47 allows positioning below an attached common trailer. Said offset flange 47 shown in both connected and disconnected states with respect to a towing vehicle in FIGS. 13 and 13A respectfully.

Figure 12:
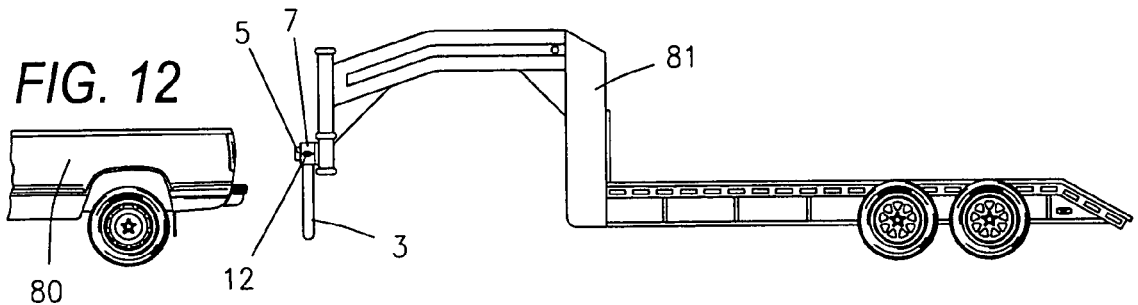
FIG. 12 is an illustration of the invention as shown in FIGS. 1 through 7 as deployed in its secured state on a gooseneck trailer.
Figure 12A:
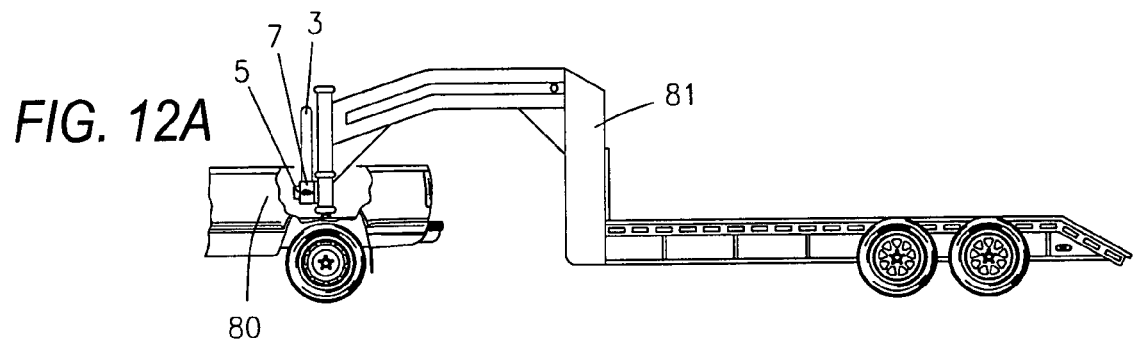
FIG. 12A is an illustration of the invention of FIG. 12 when configured and deployed in a towing, non-secured connected posture.
Figure 13:
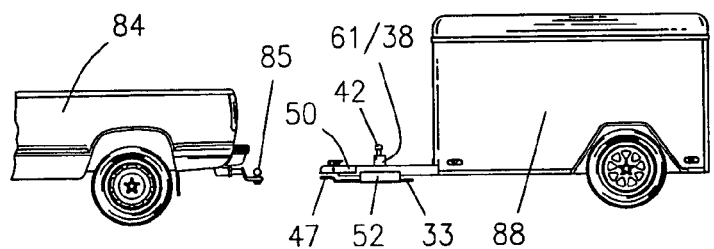
FIG. 13 is an illustration of the alternative embodiment as shown in FIGS. 10 and 11 as shown as deployed in its secured state to prevent a vehicle from aligning itself with a trailer in advance of towing the trailer.
Figure 13A:
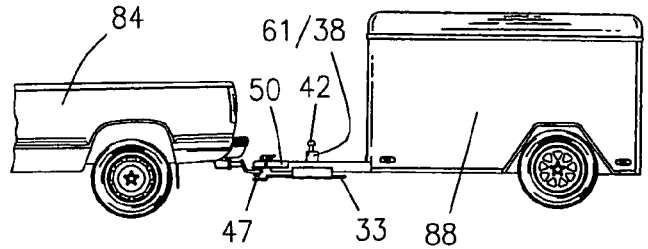
FIG. 13A is an illustration of the embodiment provided in FIG. 13 showing the embodiment configured and positioned in a non-secured manner to allow the towing of an attached trailer.

FIG. 12 is an illustration of the invention as shown in FIGS. 1 through 7 as deployed in its secured state on a gooseneck trailer. FIG. 12A is an illustration of the invention of FIG. 12 when configured and deployed in a towing, non-secured connected posture. FIG. 13 is an illustration of the alternative embodiment as shown in FIGS. 10 and 11 as shown as deployed in its secured state to prevent a vehicle from aligning itself with a trailer in advance of towing the trailer. FIG. 13A is an illustration of the embodiment provided in FIG. 13 showing the embodiment configured and positioned in a non-secured manner to allow the towing of an attached trailer.

In FIG. 12, the security bar 3 is shown to preclude vehicle 80 from positioning itself in a manner to allow for subsequent coupling and towing of trailer 81. FIG. 12A illustrates the bar 3 in a stowage position having once coupled trailer 81 and vehicle 80. In a similar manner, FIG. 13 illustrates flange 47 of bar 33 in a position to preclude vehicle 84 from backing or otherwise positioning itself and allowing insertion of ball 85 into standard hitch 50. In FIG. 13A the instant invention is shown in a stowage position embodiment with trailer 88 and vehicle 84.

The claims and specifications describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

It will of course be understood that various changes may be made in form, details, arrangement and proportions of the apparatus without departing from the scope of the invention, which generally stated consists of an apparatus capable of carrying out the objects above set forth, in the parts and combination of parts as disclosed and defined in the appended claims.

What is claimed is:

1. A security device in combination with gooseneck trailers, trailer hitches and similar articles comprising:
   a gooseneck trailer having a post with upper and lower ends, the upper end being attached to a trailer and the lower end being attached to a coupler and said security device, the security device further comprising:
   (a) a first security chamber having a proximal interior portion and a distal interior portion and attached to said coupler and a second security chamber, said first chamber having a security pin orifice bored through at least one side of the chamber to allow insertion therethrough of a security pin and at least one security bolt orifice to allow insertion therethrough of a security bolt; the said second security chamber having and at least two security bolt orifices to allow insertion therethrough of said security bolt;
   (b) a lock adapted to be inserted into the first security chamber, said lock having both lock and unlocked positions with a lock body portion dimensioned to fit within the proximal interior portion of the first security chamber and a non linear shackle portion removably retained within said lock body and dimensioned to fit within the distal interior portion of the first security chamber; and
   (c) a security bar having a security bolt orifice bored therethrough to permit the traversing of said bar by said security bolt, the security bar dimensioned to allow insertion within said second security chamber and unimpeded passage therethrough of the security bolt via said security bar security bolt orifice.

2. The security device of claim 1 wherein said device is comprised of a hardened metal.

3. The security device of claim 1 wherein said device is comprised of a hardened metal composition.

4. The security device of claim 1 wherein the security bolt further comprises a shaft and a shaft indentation portion.

5. The security device of claim 1 wherein the security bolt further comprises a shaft portion, a shaft indentation portion and a shaft grip portion.

6. The security device of claim 1 wherein the security pin further comprises a security pin bore.

7. A security device in combination with with gooseneck trailers, trailer hitches and similar articles comprising:
   a trailer hitch connected to a trailer hitch connection member;
   a security bar receiving member attached to said trailer hitch connection member, the security bar receiving member having a top portion, two distally and generally opposed side portions and a bottom portion with said portions forming a second security chamber within which a security bar may be removably inserted;
   (a) a first security chamber having a proximal interior portion and a distal interior portion and said trailer hitch connection member; said first chamber having a security pin orifice bored through at least one side of the chamber to allow insertion therethrough of a security pin and at least two security bolt orifices to allow insertion therethrough of a security bolt shaft and projection;
   (b) a lock adapted to be inserted into the first security chamber, said lock having both lock and unlocked positions with a lock body portion dimensioned to fit within the proximal interior portion of the first security chamber and a non linear shackle portion removably retained within said lock body and dimensioned to fit within the distal interior portion of the first security chamber; and
   (c) a security bar having a security bolt orifice bored therethrough to permit the traversing of said security bolt's shaft and projection portions, the security bar dimensioned to allow insertion within said second security chamber and unimpeded passage therethrough of the security bolt shaft and projection portions via said security bar security bolt orifice.

8. The security device of claim 7 wherein said device is comprised of a hardened metal.

9. The security device of claim 7 wherein said device is comprised of a hardened metal composition.

10. The security device of claim 7 wherein the security bolt further comprises shaft, shaft indentation and shaft projection portions.

11. The security device of claim 7 wherein the security bolt further comprises a shaft portion, a shaft indentation portion and a shaft grip portion.

12. The security device of claim 7 wherein the security pin further comprises a security pin orifice.

13. The security device of claim 7 wherein the security bar further comprises a offset flanged portion positioned at an end of the bar opposite that of an end dimensioned to allow insertion within said second security chamber.

* * * * *